United States Patent
Howes

(10) Patent No.: US 9,488,281 B2
(45) Date of Patent: Nov. 8, 2016

(54) SCREEN VALVES

(71) Applicant: Isentropic Ltd., Hampshire (GB)

(72) Inventor: Jonathan Sebastian Howes, Hampshire (GB)

(73) Assignee: Energy Technologies Institute LLP, Loughborough (GB)

(*) Notice: Subject to any disclaimer, the term of this patent is extended or adjusted under 35 U.S.C. 154(b) by 66 days.

(21) Appl. No.: 14/378,216

(22) PCT Filed: Feb. 5, 2013

(86) PCT No.: PCT/GB2013/050261
§ 371 (c)(1),
(2) Date: Aug. 12, 2014

(87) PCT Pub. No.: WO2013/124616
PCT Pub. Date: Aug. 29, 2013

(65) Prior Publication Data
US 2015/0034188 A1    Feb. 5, 2015

(30) Foreign Application Priority Data

Feb. 22, 2012  (GB) .................................. 1203053.2

(51) Int. Cl.
*F16K 11/07* (2006.01)
*F16K 3/02* (2006.01)
(Continued)

(52) U.S. Cl.
CPC ........... *F16K 3/0209* (2013.01); *F16K 3/0218* (2013.01); *F16K 3/28* (2013.01); *F16K 3/316* (2013.01); *F16K 39/04* (2013.01); *Y10T 137/8593* (2015.04); *Y10T 137/85978* (2015.04)

(58) Field of Classification Search
CPC .... F16K 3/0218; F16K 39/04; F16K 3/0209; F16K 3/28; F16K 3/316
USPC ................ 137/625.3, 625.33; 251/77, 79, 80
See application file for complete search history.

(56) References Cited

U.S. PATENT DOCUMENTS 290,084 A    12/1883  Maxfield
5,349,986 A *  9/1994  Sullivan ............... F16K 3/0254
                                              137/625.33

(Continued)

FOREIGN PATENT DOCUMENTS

CN    1210246 A    3/1999
CN    201032245 Y  3/2008

(Continued)

OTHER PUBLICATIONS

International Search Report and Written Opinion in International Patent Application No. PCT/GB2013/050261, mailed Sep. 3, 2013, 17 pages.
UK Search Report in Application No. GB1203053.2, Apr. 10, 2012, 4 pages.

*Primary Examiner* — Umashankar Venkatesan
(74) *Attorney, Agent, or Firm* — Lempia Summerfield Katz LLC

(57) ABSTRACT

A sliding screen valve for controlling fluid flow comprises a multi-apertured valve plate (50, 90) configured for sliding movement relative to a multi-apertured valve seat between closed and open configurations and comprises an array of apertures (60, 100) separated from one another by elongate interstitial elements angled at between 15 to 45 degrees from the axis of motion. The valve plate may be operatively connected via an actuator frame (274) controlling its movement to an actuator for sliding movement relative to the valve seat, and may be connected to the actuator via a resilient support element (272) configured to allow a floating movement of the valve plate normal to the valve plate. Initiation or termination of the sliding movement may be damped by at least one damping mechanism. The screen valve may be configured for lateral reciprocating movement and be used in gas compression and/or expansion equipment such as piston compressors or expanders.

18 Claims, 13 Drawing Sheets

(51) Int. Cl.
*F16K 39/04* (2006.01)
*F16K 3/28* (2006.01)
*F16K 3/316* (2006.01)

(56) References Cited

U.S. PATENT DOCUMENTS 5,427,146 A 6/1995 Bakken et al.
6,073,458 A 6/2000 Kim

FOREIGN PATENT DOCUMENTS

| WO | 2006100486 | 9/2006 |
| WO | 2009044139 | 4/2009 |
| WO | 2009074800 | 6/2009 |
| WO | 2009074803 | 6/2009 |

\* cited by examiner

SCREEN VALVES

RELATED APPLICATION DATA

This U.S. national phase application is based on international application no. PCT/GB2013/050261, filed on Feb. 5, 2013, which claimed priority to British national patent application no. 1203053.2, filed on Feb. 22, 2012. Priority benefit of these earlier filed applications is hereby claimed.

TECHNICAL FIELD OF THE INVENTION

The present invention relates generally to valves for controlling flow of gases and/or liquids between two discrete spaces and, in particular, to a screen valve with a valve plate configured for sliding movement, as well as apparatus incorporating such valves. The invention is particularly concerned with the provision of a sliding screen valve that is able to withstand numerous and/or rapid reciprocating movements over its lifetime.

The term "screen valve" is intended to refer to a valve in which a multi-apertured plate-like valve member moves into and out of register with a multi-apertured valve seat to allow or prevent fluid flow through the multiple apertures or ports. The invention is concerned with sliding screen valves where the plate-like member undergoes a sliding movement relative to the valve seat, i.e. a sideways or lateral movement, as opposed, for example, to a plate valve that lifts perpendicularly on and off the valve seat.

Screen valves may be used in applications such as engines, vacuum pumps, gas compressors, gas expanders, heat engines, heat pumps, other pumps, ducts, pipeflow situations and the like. They may be used in applications in which the pressure in each of the discrete spaces separated by the valve can vary such that at some stage there is no pressure difference between the spaces and at other stages there is a pressure difference.

Applicant's earlier application, WO2009074800, for example, describes a sliding screen valve comprising a flexible plate-like member configured for lateral reciprocation, which can conform to the face of a multi-apertured valve seat due to its flexibility and hence provide a good quality seal in response to a pressure differential across the valve, and also lock in the closed configuration in response to the pressure differential. It is designed to open automatically upon pressure equalisation. It is important that the time to open and close is kept to a minimum, so it is a benefit if the flexible valve plate can be accelerated and decelerated quickly. However, this gives rise to high acceleration and deceleration forces and hence a valve plate with in-built flexibility may be susceptible to tensile failure if in heavy use for protracted periods.

In any sliding screen valve, the path of the valve plate can also be significant. If the valve plate slides too close to the valve seat, then the valve plate may wear and/or friction may slow down valve events. If the valve plate is too far from the valve seat, then the valve plate may not seal properly around its attachment point and/or additional stresses may be put into the plate by the pressure that is being sealed against.

It is also desirable in a sliding screen valve to stop the valve plate accurately in its closed position and, the better this accuracy, the smaller the valve sealing areas can be, and hence, the larger the aperture area available for fluid flow. Fixed stops may be positioned on the valve to achieve this positioning, however, any abrupt halts of the valve plate against such positional mechanisms may also lead to valve plate wear and may cause rebound problems, particularly in the case of laterally reciprocating screen valves.

BACKGROUND OF THE INVENTION

Accordingly, it would be desirable to design a sliding screen valve with features that improve valve longevity and/or efficiency.

SUMMARY OF THE INVENTION

The present invention comprises a number of aspects. Terminology used and/or defined in respect of one aspect should be regarded as having the same meaning in respect of all the other aspects, unless explicitly stated otherwise.

First Aspect

In a first aspect, the present invention provides a screen valve in which at least one multi-apertured valve plate is configured for sliding movement along an axis of motion relative to a multi-apertured valve seat between a closed configuration whereby the apertures are not registered so as to prevent passage of a fluid, and an open configuration whereby the apertures are registered so as to permit passage of fluid, wherein the valve plate comprises an array of apertures in which neighbouring apertures are separated from one another by elongate interstitial elements at least some of which are angled at between 15 to 45 degrees from the said axis of motion.

By angling the hole pattern dividers on the screen valve at an angle of between 15 and 45 degrees (from the centreline or axis of the elongate interstitial elements) to the axis of motion, the stress path through the valve plate is improved as it moves sideways away from and towards the valve seat.

Where a screen valve is configured for laterally reciprocating valve movements to bring the apertures in and out of registration, this arrangement of interstitial elements provides improved resistance to the acceleration and deceleration loads associated with the frequent kick-offs and halts, and hence improved longevity. This is especially the case where the screen valve is designed to be flexible and/or where the screen valve is operatively connected (e.g. to an actuator) for rapid reciprocating valve movements.

The laterally reciprocating movement, that is, to and fro movements sideways of the valve plate, may be linear or rotary reciprocation. The valve plate (and seat) may be flat or (e.g. slightly) curved; in the latter case, reciprocation can be in either the direction of any curve or perpendicular to it. Where the surface is planar, the valve may reciprocate in a rotary manner i.e. around a central pivot point. Usually, the movement will be rectilinear reciprocating movement along a straight axis of motion, and while the valve plate will move generally in its own (flat or curved) plane, it may tilt slightly, for example, when entering and leaving the valve seat.

Usually at least 50%, preferably at least 66%, or at least 75%, and ideally, all the elongate interstitial elements separating neighbouring apertures on the plate are angled at between 15 to 45 degrees from the said axis of motion. If, however, there are both elongate interstitial elements disposed perpendicular to the axis of motion, and other non-perpendicular elements, i.e. elements that separate transversely extending neighbouring apertures, then at least 50%, preferably at least 66%, or at least 75%, and ideally all of the interstitial elements that separate transversely extending neighbouring apertures are angled at between 15 to 45 degrees. Interstitial elements disposed perpendicular to the axis of motion are not of concern (e.g. such as might be found in adjacent rows of hexagonal apertures).

Angled elongate interstitial elements are of particular benefit in valve plates having thicknesses of less than 3 mm or even less than 2 mm and/or elongate interstitial elements less than 1.5 mm or even less than 1 mm in width. However, speed and distance of reciprocation are also factors that can vary these critical values.

In one embodiment, the total open aperture area (i.e. the total open aperture area when the first and second parts are in the open configuration) is over 20%, or over 30%, or even over 40% of the total valve area.

In one embodiment, the aperture density (i.e. the number of apertures per unit area of valve surface) is greater than 1000 per $m^2$, or greater than 2000 per $m^2$, or even greater than 4000 per $m^2$.

In one embodiment, the average aperture area is less than 4%, or less than 2%, or less than 1% of the total valve area.

In one embodiment, the sealing area around the apertures is less than 40%, less than 30%, or less than 20% of the total valve area.

In one embodiment the valve has a mass of less than 20 kg per $m^2$, or less than 10 kg per $m^2$, or less than 5 kg per $m^2$.

In one embodiment, said array of apertures comprises respective rows of apertures extending transversely to the axis of motion, each row comprising apertures defined by elongate interstitial elements (e.g. narrow struts), and preferably being separated from one another by transversely extending solid portions or lands (intended to block off corresponding rows of apertures in the valve seat). Each row of apertures may be separated from the next row by a transversely extending solid portion or land, the interstitial elements extending between adjacent lands so as to define the adjacent apertures. Single rows of apertures may be provided between lands so as to achieve small, fast valve movements.

In one embodiment, the interstitial elements that separate neighbouring apertures extending transversely to the axis of motion are all preferably angled at between 20 to 40 degrees, more preferably between 25 to 35 degrees from the said axis of motion.

In one embodiment, the interstitial elements that separate neighbouring apertures extending transversely to the axis of motion are angled at mirror orientations to one another so as to subtend respective pairs of +/− mirror angles to the said axis of motion. In a row of apertures the interstitial elements will usually be angled alternately at the + and − mirror angles to provide a balanced distribution. Preferably, all the interstitial elements in the array that separate neighbouring apertures extending transversely to the axis of motion subtend the same pair of +/− mirror angles to the said axis of motion.

In one embodiment, rather than being randomly arranged, the interstitial elements are aligned with respect to one another across the array of apertures so as to form lines of load bearing. Hence, interstitial elements in adjacent rows will line up so that they lie along the same line of load bearing. By aligning the interstitials, the local loads created at both ends of the respective interstitials (i.e. the nodes) are aligned thereby providing lines of load bearing. Preferably, they will form parallel lines of load bearing, preferably evenly spaced from one another. Usually, mirror image lines of force defined by interstitials subtending mirror angles with respect to the axis of movement should be provided for even load bearing, when acceleration loads are applied in the opposite direction.

In one embodiment, the at least one multi-apertured valve plate is a flexible plate-like member, for example, a flexible plastics material or thin (e.g. <3 mm) flexible metal sheet.

The valve material can be made from a variety of materials, some examples are plastics (e.g. Mylar, Peek), composites (e.g. Carbon, Glass, Aramid, (i.e. high temperature resistant aromatic polyamides)), Epoxys, metals (e.g. stainless steel) and ceramics (e.g. thin silicon carbide Carbon sheets). The temperatures and pressures involved will have a significant impact on the actual material selected to ensure that it does not adversely deform under use. For higher temperatures, stainless steels or high-performance alloys may be used. Superalloys that exhibit good creep resistance, mechanical strength and fatigue life at high temperatures have been developed especially for use in gas turbines and these are usually nickel or cobalt-based alloys; examples of superalloys would include Inconel™ or Hastelloy™. In certain applications it can be useful to use materials that suffer from creep and plastic deformation as they have other beneficial properties. In this case the creep and plastic deformation can be overcome by bonding a stronger material to provide localised strength, such as stainless steel on Mylar. The valve material (including the flexible plate-like member) may be laser cut, water cut, photo etched, cut or formed by other means.

As mentioned previously, a screen valve may have a plate-like member that is sufficiently flexible to conform to the sealing face of the valve seat, for example, in response to a pressure differential across the valve. If such a lightweight, flexible plate-like member is provided with angled interstitial elements as detailed above, it can better withstand high inertial loads from accelerations and decelerations and/or high pressure loads.

In the case of a flexible valve plate, the aperture size may be configured such that the flexible plate-like member can bridge corresponding apertures in the second part without significant sagging. Furthermore, the aperture size may be configured to ensure that the flexible valve plate does not catch a lip of the corresponding apertures in the second part as the first part moves into the closed configuration.

The elongate interstitial elements may be straight-edged or may have slightly curved edges (forming slightly rounded hole patterns) and may widen at their respective ends for additional strength. They may define, for example, one or more of hexagonal, triangular or trapezoidal apertures.

The holes may be lightly rounded with internal radii to further reduce stress concentrations. In one embodiment, the multi-apertured valve plate comprises interstitial elements that widen to concave intersections defining apertures with rounded corners. It is desirable for some (at least 50%) or all apertures to have rounded corners to reduce stress concentrations at the respective nodes of the interstitial elements.

Second Aspect

According to a second aspect of the present invention, there is provided a screen valve for controlling fluid flow comprising at least one multi-apertured valve plate operatively connected via an actuator frame to an actuator for sliding movement relative to a multi-apertured valve seat, wherein the movement of the at least one valve plate is controlled by the actuator frame.

The screen valve undergoes sliding valve movements under the control of the actuator to bring the multiple apertures in and out of registration with the valve seat to allow and prevent fluid flow, respectively. In a multi-apertured valve, the distances may be quite small. It is important that the screen valve can move between an open and a closed position quickly while also controlling the position of the valve plate such that it remains correctly aligned with the apertures. Ideally the sealing edge around the apertures is kept to a minimum, however, if the position of the valve at closure is incorrect then the valve may fail to seal correctly. Therefore the actuator needs to have an accurate stop position for each movement relative to the valve apertures. Where an actuator frame is used to control the movement of the valve plate, usually while supporting it (e.g. from above or below or the side), this frame can improve positional control; in particular, the frame may interact with positional mechanisms (e.g. stops) without involving the (usually less robust) valve plate; hence, none of the edges of the valve plate need to come into contact with any other surface during normal operation.

The actuator frame may comprise a one-piece or multi-component body, skeleton or framework (e.g. of beams). The frame may be arranged substantially to overlie the valve plate, or, alternatively, may drag/push the valve plate (e.g. from an edge). It will usually be the same order of size as the respective valve plate it is controlling, for example, extending in one dimension (e.g. normal to axis of motion) at least a third, preferably at least half and even at least two-thirds of the corresponding dimension of the valve plate, but usually no more than one, or, one and one-third times that dimension. If, however, the frame is configured to move/control multiple plates in unison, which is where its usage can be advantageous, then the above dimensions are with reference to the total dimension of the respective valve plates it is controlling.

The term "actuator" is used in its broadest sense to mean an actuating device that is able to actuate mechanical motion (in this case, lateral reciprocation) of the valve plate. The device may be a mechanism that transforms a signal (e.g. electric signal) into motion and may be selected from a motor, transducer, piston, electromagnet, or the like and may include, for example, a piezoelectric, pneumatic or hydraulic actuator (used only here in its narrow sense), hydraulic piston, or electric motor.

The at least one valve plate may be configured to undergo a laterally reciprocating movement, where the valve plate is moved back and forth laterally by the actuator. These actuated movements may be a linear (e.g. rectilinear) or rotary reciprocating movement relative to the valve seat. The valve plate and valve seat may be mounted in parallel planes that occupy any orientation (with the frame correspondingly oriented), although they will usually occupy horizontally disposed planes, with the valve plate either reciprocating to and fro above, or below, the valve seat.

Conveniently, the actuator frame may control the movement of multiple valve plates in unison. It is often preferable to cover a valve seat area with multiple smaller valve plates, while the actuator frame allows them to be controlled together. Smaller plates have the following benefits: they are less prone to distortion from thermal effects i.e. cupping in response to heat on one side of the plate only or just thermal expansion and contraction; if multiple attachment points are picked on a single plate then there is a greater likelihood that the attachment points will come into conflict and induce stresses between them; if only one or two attachment points are used then the stresses at the attachment points grow significantly as the valve plate gets larger; smaller plates have lower inertial forces per plate, so this can therefore mean lower stresses at each attachment point and furthermore multiple plates are unlikely to suffer from simultaneous hard impacts, as they are unlikely to all be stopped at exactly the same time.

Preferably, the at least one valve plate is operatively connected to the frame (e.g. supported) at multiple locations along the actuator frame. Usually, the frame supports the valve plate weight and guides its movement, but in some sliding arrangements no physical support may be required.

Supporting the valve plate at multiple points along the actuator frame permits rotational and/or translational movements of the valve plate beyond the actuator driven movements for improving valve plate positioning.

The multiple locations may be multiple parts of the actuator frame (e.g. points or regions) that are spaced from each other, or, they may be adjacent parts of the actuator frame forming at least one continuous region extending along the frame, where again multiple (i.e. different) parts of the frame provide the support.

Similarly, the at least one valve plate is preferably operatively connected (e.g. supported) by the actuator frame at multiple locations on the surface of the valve plate. Likewise, the multiple locations on the valve plate may be multiple adjacent parts or multiple spaced parts of the valve plate. Each part (e.g. point or region) on the frame will preferably be paired with a single corresponding part (e.g. point or region) on the valve plate.

As indicated above, the frame allows better positional control to be achieved in the valve so that the plate starts and stops at the correct point in relation to the ports. This can be by the frame allowing the valve plate certain degrees of freedom and/or interacting with other positional mechanisms by it, depending on the valve environment. For example, the valve plate may be subject to pressure loads (during gas expansion or compression) or inertial loads (if provided upon a moving body e.g. piston face) which affect its motion, and the actuator frame can support the plate flexibly so as to adapt/compensate for these.

The six degrees of freedom of movement of a rigid body in three dimensions comprise the following three translational and three rotational degrees:—
  1. Moving up and down (heaving)
  2. Moving left and right (lateral)
  3. Moving forward and backward (longitudinal)
  4. Tilting forward and backward (pitching)
  5. Turning left and right (yawing)
  6. Tilting side to side (rolling)

Beyond the actuated reciprocation, the actuator frame (including any attachments) may be configured to allow one, or two or three degrees of rotational freedom in the one or more valve plates. The frame may control such rotation in the at least one valve plate and any of these may be a limited rotation, for example, usually up to + or −20°, and in particular, up to + or −10°. Usually, the frame will not need to impart any roll or pitch stability as the screen valve can provide this itself when it seals (e.g. valve seat and any opposed retaining plate will confine the valve plate). Preferably, the actuator frame controls rotation of the valve plate in its own plane (yaw), as a mis-alignment may result in a failure to seal.

The actuator frame (including any attachments) may be configured to allow one, two or three degrees of translational freedom (usually limited freedom) to the one or more valve plates beyond the actuated reciprocation in the plane of the valve. Hence, the actuator frame may be configured to control (preferably limited) movement of the one or more valve plates in the plane of the valve plates, but in a direction normal to the direction of movement of the actuator (e.g. laterally if the plates are being forced to reciprocate longitudinally), as again a mis-alignment may result in a failure to seal.

Furthermore, the frame may be configured to control movement of the one or more valve plates normal to the (plane of the) valve plates, so as to control the separation distance of the valve plate and valve seat. For example, the frame may be configured to pitch about one or multiple pivot or hinge points on the frame (e.g. necked flexures), allowing the supported valve plate to lift or drop normally out of its plane; in this case, all the support on the plate may usually be at just one downstream axial location (relative to the axis of motion). Alternatively, resilient support elements provided between the frame and the valve plate may be used, as discussed below. These may be smaller and lighter than the frame (i.e. less mass) and hence less subject to inertial loads.

In one embodiment, the actuator frame comprises at least a first equalizing sub-frame having a pivot point. By "equalizing sub-frame" is meant a mechanism in which forces are capable of being evenly distributed through linkages and comprising at least one equalizing frame member (e.g. beam) pivoted at a pivot point at or near its centre; thus, when a force is applied to the pivot (in this case by the actuator), an opposing force is applied to the equalizing frame member (e.g. beam) via linkages disposed along its length (in this case, connections between the multiple locations on the sub-frame and corresponding locations on the valve plate). Such a mechanism is also known as a whippletree or whiffletree mechanism and has been found effective for accurate positioning of the multi-apertured valve plate in the closed configuration (for successful valve sealing) and/or the open configuration (for improved valve efficiency/throughflow).

Where the actuator is configured for rectilinear reciprocation in a plane, the equalizing beam will usually extend at right angles to the axis of motion of the actuator.

The at least one valve plate may be supported at multiple locations along the sub-frame around its pivot point, or the sub-frame may support other components which have the multiple locations for supporting the valve plate. The pivot point may be selected from any suitable component, hinge, joint or bearing to provide the desired degree of rotational freedom, as discussed above, and could be for example, a necked flexure, or hinge (e.g. a pin hinge).

In a preferred embodiment, the at least first equalizing sub-frame is supported at its pivot point by a single elongate axial element that permits the sub-frame to roll and/or pitch and/or yaw. The elongate element may be a planar or cylindrical flexure and may be necked. This design will permit only limited roll and/or pitch and/or yaw to the sub-frame.

The first equalizing sub-frame may support one or more downstream equalizing sub-frames; each upstream sub-frame will usually support two or three sub-frames in a (subsequent) downstream stage. In a preferred embodiment, all upstream sub-frames support a pair of downstream sub-frames. Depending on the number and size of the valve plates, two or three overall stages of sub-frames may be required.

For accurate valve positioning, the actuator frame preferably comprises a series of equalizing sub-frames so configured as to lock in their desired configurations in any order, in response to an opposing force of the actuator.

A whiffletree (called a whippletree in the US) is a mechanism to distribute force evenly through linkages. In this case it is used to ensure that all valves stop in the correct position. Due to manufacturing tolerances, it is difficult accurately to control the stop position of a number of valves (i.e. plates) if rigidly held. However, if pulled (or pushed) via a whippletree then regardless of the order that different valves hit their one or more stops, they will all finish abutting their respective one or more stops. If you just pull the mechanism then all valves MUST end up abutting their respective one or more stops, the only difference between two different sets of valves is that you might need to pull or push the mechanism slightly further on one than the other.

The actuator frame may be configured to interact with positional mechanisms in the apparatus, for example, on the valve, specifically the valve seat, to position the valve plate correctly, for example, to secure it in the desired closed or open configuration. Positional mechanisms may comprise one or more linkages, connectors, stops, barriers, damping mechanisms, interengaging parts (abutments and stops) or the like.

In one embodiment, at least one equalizing sub-frame comprises one or more abutments or abutment surfaces, usually symmetrically arranged, configured to abut corresponding respective stops provided on the valve seat to position the valve plate in the closed and/or open valve configuration.

The positional mechanism may comprise a damping mechanism for damping the kinetic energy of the actuator frame. Unlike the valve plate, the design of the frame can be engineered specifically to withstand interactions with positional mechanisms and damping mechanisms can also be included for example to address rebound from hard stops, especially in laterally reciprocating valves.

The damping mechanism may be as described below in respect of the fourth aspect. For example, it may be a double action damping mechanism so configured as to provide damping at each end of the reciprocating stroke of a moving component of the actuator frame.

Where the actuator frame comprises at least one equalizing sub-frame as above, the at least one damping mechanism may be configured to act directly on the at least one, or on every equalising sub-frame, to dampen its movements. This may be desirable for reducing the stress on linkages as the damping can be designed to match the size of the local components.

The damping mechanism may comprise a percussive damping mechanism, as described below in respect of the fourth aspect.

The frame may comprise a thin planar body or a framework, preferably a one-piece body or framework, and may have hollow or cut-out sections for reduced weight. It may be formed from metal, or plastics or composite and may be formed as a one-piece article, for example, by injection moulding or by photo etching or by waterjet cutting.

The actuator frame may be a supporting structure arranged to support and move a single valve plate, or a plurality of valve plates in unison. Each valve plate may have two or more locations at which it is supported, usually arranged symmetrically around its centre of gravity, and usually this will be at just one downstream axial position relative to the axis of motion.

The one or more valve plates may supported by the actuator frame via intermediate support elements, which may be integral or separate to the frame, and may be integrally formed with or separate to the valve plate. These may extend between points or regions on the frame and points or regions on the plate, and may be rigid or resilient, and branched or solid in structure.

Preferably, the valve plate is integrally formed with, or securely attached to the actuator frame or any intermediate support element, so that there is no play in any connections that could lead to wear. Also, preferably none of the edges of the valve plate come into contact with any other surface during normal operation since the use of the frame renders this unnecessary.

The valve plate may be supported by the actuator frame via one or more resilient support elements so configured as to allow limited movement of the valve plate normal to its own plane. The resilient support elements, for example, flat spring elements, confer an additional translational degree of freedom, allowing the separation distance of the respective planes of the valve seat and valve plate to be varied slightly. Such "floating" of the valve plate allows it to move close enough to the valve seat for effective sealing, whilst ensuring that it is not permanently so close to the seat that friction is encountered giving rise to wear or slower valve events. The resilient support elements may be as described below in respect of the third aspect.

The valve plate may be positioned between the valve seat and a retaining plate for lateral reciprocating movement, the actuator frame being positioned the other side of the retaining plate (such that any support elements extend through apertures in the retaining plate). The use of a retaining plate is especially advantageous where the valve is configured to allow a floating movement of the valve plate normal to its own plane, which floating may be facilitated by the actuator frame and/or by the use of resilient support elements. The retaining plate may be configured to protect the valve plate and restrict its out-of-plane movements, in particular, constraining it to remain close to the valve seat, for example, not further away than 2 thicknesses, or preferably 1 thickness, or ideally not further away than 75% or even 50% of the thickness of the valve seat. The retaining plate will usually comprise a substantially planar body, usually of relatively thin material, and may comprise a foraminous screen configured to substantially cover the valve plate. It may comprise a series of wires in tension, a series of studs with caps, a thin cut metal sheet; or, metallic webbing.

As mentioned previously, in Applicant's earlier application WO2009/074800, a screen valve is used which may have a flexible plate-like member and be configured to engage a sealing surface of the valve seat when the screen valve is in a closed configuration and lock in the closed configuration; it may be configured to conform to the sealing face of the valve seat, for example in response to a pressure differential across the valve. It has been found to be especially beneficial to control the movements and the positioning of a lightweight flexible valve plate using an actuator frame as described above.

In a preferred embodiment, the at least one multi-apertured valve plate is a flexible plate-like member. Advantageously, the flexible plate-like member is (sufficiently flexible to be) able to conform to the face of the multi-apertured valve seat so as to provide a seal.

Third Aspect

According to a third aspect of the present invention, there is provided a screen valve for controlling fluid flow comprising at least one multi-apertured valve plate operatively connected to an actuator for sliding movement relative to a multi-apertured valve seat, the valve plate being connected to the actuator via one or more resilient support elements configured to allow a floating movement of the valve plate normal to the valve plate.

During the sliding movement, the at least one valve plate is moved sideways by the actuator, often at high speeds, while the one or more resilient support elements allow movement or "floating" in a direction normal to the valve plate (e.g. normal to its own plane) i.e. such that the valve seat/valve plate spacing varies. This allows the valve plate to move close enough to the valve seat for effective sealing, whilst ensuring that it is not permanently so close to the seat that friction is encountered giving rise to wear or slower valve events. Hence, the present screen valve may be opened and closed quickly, while maintaining longevity and effective sealing.

Ideally the valve plate mass is kept as low as possible to reduce inertial forces while not compromising pressure load carrying capability. If a fixed support element is used instead of a resilient support element and there is a gap between the valve plate and the valve seat, then either the valve will not seal properly or it will seal while inducing a stress in the valve plate material that is locally bridging the gap between valve plate and valve seat—normally around the support attachment. Thin valve plates may suffer reduced life from fatigue if expected to deal with these bridging stresses.

This resilient support arrangement is preferred in gas flow valves (e.g. expansion and/or compression applications), where the support elements allow varying pressure loads to move the valve plate as required. In applications where there is likely to be temperature cycling and differential expansion of the thin plate valve relative to its environment this support arrangement is also highly preferred over a fixed spacing from the valve seat.

The sliding movement may be a laterally reciprocating movement, where the valve plate is moved back and forth laterally by the actuator. This may be linear (e.g. rectilinear) or rotary movement relative to the valve seat, and may be between a closed configuration whereby the apertures are not registered so as substantially to prevent passage of a fluid, and an open configuration whereby the apertures are registered and passage of fluid is permitted. The valve plate and valve seat may be mounted in parallel planes that occupy any orientation, although they will usually occupy horizontally disposed planes, with the valve plate either reciprocating to and fro above, or below, the valve seat.

In one embodiment, the one or more resilient support elements is configured to constrain the at least one valve plate closely to follow the movements of the actuator in the plane of the valve plate, while allowing a floating movement in the direction normal to the plane. While the resilient support element may flex slightly so as to allow the separation distance to vary, it should be sufficiently stiff to both push and pull the valve plate during reciprocation, and to closely follow the movement of the actuator. If the valve plate is not positionally correct in relation to the valve seat, then even if the spacing between the valve plate and valve seat is correct, the valve plate still may not seal in a closed configuration.

Preferably, in the valve, the extent of the to and fro floating movement of the valve plate normal to its plane is not more than 200%, more usually not more than 100%, preferably not more than 75%, and ideally not more than 50% of the thickness of the valve seat. The extent may be constrained by the flexing properties of the resilient support element or may be constrained by the presence of a retaining plate.

In a preferred embodiment, the valve plate is disposed between the valve seat and a retaining plate. The retaining plate may be configured to protect the valve plate and/or restrict its out-of-plane movements, where these are not sufficiently restricted by the support elements. The support elements may extend through apertures or gaps in the retaining plate. The retaining plate will usually comprise a substantially planar body, usually of relatively thin material, and may comprise a foraminous screen configured to substantially cover the valve plate. It may comprise a series of wires in tension, a series of studs with caps, a thin cut metal sheet; or, metallic webbing.

In a preferred embodiment, the at least one multi-apertured valve plate is a flexible plate-like member. In one embodiment, the at least one multi-apertured valve plate is a flexible plate-like member, for example, a flexible plastics material or thin (e.g. <3 mm) flexible metal sheet.

The valve material (including the flexible plate-like member) can be made from a variety of materials, some examples are plastics (e.g. Mylar, Peek), composites (e.g. Carbon, Glass, Aramid, (i.e. high temperature resistant aromatic polyamides)), Epoxys, metals (e.g. stainless steel) and ceramics (e.g. thin silicon carbide Carbon sheets). The temperatures and pressures involved will have a significant impact on the actual material selected to ensure that it does not adversely deform under use. For higher temperatures, stainless steels or high-performance alloys may be used. Superalloys that exhibit good creep resistance, mechanical strength and fatigue life at high temperatures have been developed especially for use in gas turbines and these are usually nickel or cobalt-based alloys; examples of superalloys would include Inconel™ or Hastelloy™. The valve material (including the flexible plate-like member) may be laser cut, water cut, photo etched, cut or formed by other means.

Advantageously, the flexible plate-like member is (sufficiently flexible to be) able to conform to the face of the multi-apertured valve seat so as to provide a seal, for example, in response to a pressure differential across the screen valve. As explained in Applicant's WO2009/074800, such a lightweight valve member may be locked in place by even a small pressure difference and be used to provide fast valve movements for a small energy input. The conformability may also ensure a good seal even in the event of some valve contamination. However, if a flexible valve plate is too close to the valve seat, then there is significant wear and friction when moving the valve plate. If positioned too far away, the valve plate does not seal properly to the valve seat and/or it puts a fatigue load into the valve plate. Arranging for such flexible valve plates to float using resilient support elements allows the plates to respond to pressure loads and adopt desired positions without undue wear.

In one embodiment, the one or more resilient support elements comprises a flat spring element, whereby flexing occurs around its hinge(s), usually an elongate flat element having one or two hinged ends. Other biased connectors (e.g. electrical, mechanical, pneumatic, magnetic or other) could also be used, such as a hinged plate with a coiled spring acting on the plate.

In one embodiment, the one or more resilient support elements are so angled that movement of the actuator in one direction generates a bias force that tends to lift the valve plate away from the plane of the valve seat. The elements may be configured so that movement of the actuator away from the closed configuration will generate a lifting bias force, or, so that movement of the actuator towards the closed configuration will generate a lifting bias force. Such biasing is helpful, for example, in a moving valve where inertial loads are trying to push the valve plate down onto the valve seat. The one or more resilient support elements will usually comprise an angled section subtending an angle of up to 20 degrees with the plane of the valve plate, however this angle will vary depending upon how close to the valve plate the actuator and resilient connector can be positioned.

In one embodiment, the one or more resilient support elements are integrally formed with the valve plate. This may be by virtue of a cut-out tab from the valve plate. The cut-away area may help relieve stress at the site. However, this does involve sacrificing some active valve area and the support element then will be the same material as the valve plate.

The one or more resilient support elements may be fixedly attached to the at least one valve plate, for example, by clamping, riveting or welding. At least one cut-away section or slot may be provided in the at least one valve plate around the point of connection of the resilient support element to the valve plate to relieve any distortion.

Where the valve plate is integrally formed with, or securely attached to the resilient support element, there is no play in any connections that could lead to wear. Also, preferably none of the edges of the valve plate come into contact with any other surface during normal operation to minimise wear.

If the valve plate is supported by a single support element this may be located in the vicinity of its centre of gravity, and where a plurality of support elements are provided, they are preferably arranged symmetrically around the centre of gravity.

In one embodiment, the valve plate is operatively connected via an actuator frame to an actuator for lateral reciprocating movement, wherein the actuator frame supports the one or more resilient support elements.

The actuator frame may have any of the features as described above in relation to the second aspect. In particular, the actuator frame may comprise at least a first equalizing sub-frame having a pivot point. Where the actuator is configured for rectilinear reciprocation in a plane, the equalizing beam will usually extend at right angles to the axis of motion of the actuator.

Fourth Aspect

In a fourth aspect, the present invention provides a screen valve for controlling fluid flow comprising at least one multi-apertured valve plate configured for sliding movement relative to a multi-apertured valve seat, the valve being configured such that initiation and/or termination of the sliding movement is damped by at least one damping mechanism. By providing such a mechanism, kick-offs and/or halts of the valve plate may be softened to improve valve longevity.

In a multi-apertured valve, the distances may be quite small. Where the valve plate undergoes reciprocating (e.g. rotary or linear) valve movements to bring the multiple apertures in and out of registration with the valve seat, these will usually be fast and frequent, and hence, the use of a damping mechanism is especially desirable to improve longevity. Also, damping can reduce undesirable rebound and hence improve valve sealing because it is possible for a rebounding valve plate to lock in a partially closed position. This is undesirable as the valve will not seal correctly and there will be an associated gas leak.

The at least one multi-apertured valve plate may be operatively connected to an actuator for sliding movement, especially where this is lateral reciprocating movement.

The at least one multi-apertured valve plate may be operatively connected via an actuator frame to the actuator and the movement of the at least one valve plate may be controlled by the actuator frame. The actuator and/or frame may be as described above in respect of the other aspects.

It is important that the screen valve can move between an open and a closed position quickly while also controlling the position of the valve plate such that it remains correctly aligned with the apertures. Ideally the sealing edge around the apertures is kept to a minimum, however, if the position of the valve at closure is incorrect then the valve may fail to seal correctly. Therefore the actuator needs to have an accurate stop position for each movement relative to the valve apertures. Where an actuator frame is used to control the valve plate and usually support it (e.g. from above or below or the side), this can facilitate accurate positioning. The frame can, for example, interact with damping and/or positional mechanisms (e.g. stops) without involving the (usually less robust) valve plate; hence, none of the edges of the valve plate need to come into contact with any other surface during normal operation. Also, a single frame can control (and damp) multiple valve plates in unison.

Preferably, the at least one valve plate is supported at multiple locations along the actuator frame, and similarly, the at least one valve plate is preferably supported by the actuator frame at multiple locations on the surface of the valve plate, as described above in respect of the other aspects.

The actuator frame may be configured to interact with positional mechanisms in the apparatus, for example, on the valve, specifically the valve seat, to position the valve plate correctly, for example, to secure it in the desired closed or open configuration. Positional mechanisms may comprise one or more linkages, connectors, stops, barriers, damping mechanisms, inter-engaging parts (abutments and stops) or the like.

The at least one damping mechanism may be configured to act directly on the actuator frame to dampen its movements, thereby damping the initiation and/or termination of the sliding movement of the valve plate, and may optionally form part of a positional mechanism.

In one embodiment, the actuator frame comprises at least a first equalizing sub-frame having a pivot point and the at least one damping mechanism is configured to act directly on the at least one equalising sub-frame to dampen its movements. By "equalizing sub-frame" is meant a mechanism in which forces are capable of being evenly distributed through linkages and comprising at least one equalizing frame member (e.g. beam) pivoted at a pivot point at or near its centre; thus, when a force is applied to the pivot (in this case by the actuator), an opposing force is applied to the equalizing frame member (e.g. beam) via linkages disposed along its length (in this case, connections between the multiple locations on the sub-frame and corresponding locations on the valve plate). Such a mechanism is also known as a whippletree or whiffletree mechanism and has been found effective for accurate positioning of the multi-apertured valve plate in the closed configuration (for successful valve sealing) and/or the open configuration (for improved valve efficiency/throughflow). However, the degrees of freedom inherent in such a mechanism can give rise to undesirable oscillations/rebound and hence, it is often desirable to use a damping mechanism in conjunction with such equalising sub-frames.

The first equalizing sub-frame may support one or more downstream equalizing sub-frames; each upstream sub-frame will usually support two or three sub-frames in a (subsequent) downstream stage. In a preferred embodiment, all upstream sub-frames support a pair of downstream sub-frames. Depending on the number and size of the valve plates, two or three overall stages of sub-frames may be required. For accurate valve positioning, the actuator frame preferably comprises a series of equalizing sub-frames so configured as to lock in their desired configurations in successive order, starting with the most downstream sub-frames, in response to an opposing force of the actuator.

In one embodiment, at least one equalizing sub-frame comprises one or more abutments or abutment surfaces, usually symmetrically arranged, configured to abut corresponding respective stops provided on the valve seat to position the valve plate in the closed and/or open valve configuration. Where the frame comprises a first equalizing sub-frame and/or one or more downstream equalizing sub-frames, damping mechanisms may be provided to interact with all the sub-frames, or only with those sub-frames supporting valve plates (for example, the most downstream sub-frames). Such equalizing sub-frames may comprise one or more abutments or abutment surfaces, usually symmetrically arranged, configured to abut corresponding respective stops provided on the valve seat to position the valve plate in the closed and/or open valve configuration and also usually configured to interact with an associated damping mechanism.

The resilient support elements, for example, flat spring elements, confer an additional translational degree of freedom, allowing the separation distance of the respective planes of the valve seat and valve plate to be varied slightly. Such "floating" of the valve plate allows it to move close enough to the valve seat for effective sealing, whilst ensuring that it is not permanently so close to the seat that friction is encountered giving rise to wear or slower valve events. The resilient support elements may be as described above in respect of the other aspects.

The valve plate may be positioned between the valve seat and a retaining plate, the actuator frame being positioned the other side of the retaining plate. The retaining plate may be as described above in respect of the other aspects.

In a preferred embodiment, the at least one multi-apertured valve plate is a flexible plate-like member. Such a valve plate is more susceptible to wear and damage and hence the use of a damping mechanism is especially beneficial. The flexible plate-like member may be as described above in respect of the other aspects.

In a preferred embodiment, the sliding screen valve comprises a percussive damping mechanism in which a component of the valve intended for sliding movement is configured to approach a stationary impact surface, and at least one damper mass is also provided for damping the motion of the component, the mechanism being configured such that as the component approaches the impact surface it collides with the at least one damper mass in an initial position to cause the at least one damper mass to bounce back and forth between the impact surface and the approaching component undergoing a series of collisions with the component that decelerates it. The impact surface is configured to remain stationary during the damping and may be part of the valve or surrounding apparatus. The series of collisions may involve a single damper mass or multiple damper masses that (act in series and/or in parallel to) bounce back and forth between the impact surface and the approaching component. Multiple dampers may comprise a plurality of rounded damper masses or a plurality of resilient cantilevers.

Usually, the moving component is configured to follow a linear or rotary, laterally reciprocating path. In that case, the damping mechanism may be a double action damping mechanism so configured as to provide damping at each end of the reciprocating stroke of the moving component.

Conveniently, the damping mechanism comprises a common damper mass so configured as to damp the motion of the moving component at each end of its reciprocating stroke.

In one embodiment, the component of the valve intended for sliding movement is the actuator frame or an equalising sub-frame thereof.

The damping mechanism may include a reset mechanism that repositions the at least one damper mass in the initial position for re-use. The damping mechanism may be configured so that the collision of the at least one damper with the body and/or the collision of the at least one damper with the impact surface involves at least one convex surface.

All Aspects

The applications of the present invention in any one or more of its four aspects will now be considered. One particular application is the use of such screen valves as either inlet or outlet valves for gas compression/expansion equipment (where high pressure loads may exist). This may include positive displacement equipment such as piston compressors or piston expanders and may include cylinder head valves, cylinder wall valves and piston face valves. In certain cases the valves may be located on a moving surface, such as the face of a moving piston (where high inertial loads may exist). In particular, such valves may be used in the piston expansion/compression assemblies of heat pumps/heat engines (where high or low or cycling temperatures may exist). Such piston assemblies are described for example in Applicant's earlier application WO2006/100486.

The present valve may be advantageously used in a heat pump/engine of a pumped heat electrical energy storage system, especially one in which the valves are required to undergo rapid and frequent reciprocating movements over a period of years, often with limited access to replace them; such a system is described, for example, in Applicant's earlier application WO2009/044139.

For example, on the active piston face of a gas compression/expansion piston assembly, the valve plate will need to withstand frequent reciprocating valve movements in excess of 300 full reciprocations/minute, or even 600 full reciprocations/minute. In heat pumps/heat engines, for example, ones used in a Pumped Heat Energy Storage System (PHES), the valve design needs to withstand operating temperatures of more than 300° C., especially more than 450° C. and temperatures of less than −50° C., especially, less than −100° C. Furthermore, in a PHES, valve plates lifetimes in excess of 2 years may be required in order to ensure that the valve servicing/replacement is infrequent.

Thus, the present invention further provides apparatus comprising any of the screen valves described above (i.e. in any of its four aspects), and, in particular, apparatus wherein the screen valve is located upon a moving surface in the apparatus, optionally a moving piston face. There is further provided apparatus comprising gas compression and/or expansion equipment in which at least one gas inlet and/or outlet valve comprises a screen valve as described above. The equipment may comprise positive displacement equipment, and optionally, piston expanders and/or piston compressors. The gas compression and/or expansion equipment may be incorporated in a heat pump and/or heat engine. The present invention further provides the use of such a screen valve in any of the above apparatus.

The present invention further provides any novel and inventive combination of the above mentioned features which the skilled person would understand as being capable of being combined. In particular, features from any one of the four above aspects may be incorporated in any of the above aspects, except where such features are clearly indicated as being alternatives or incompatible.

BRIEF DESCRIPTION OF THE DRAWINGS

The present invention will now be described, by way of example only, with reference to the accompanying drawings in which:—

DETAILED DESCRIPTION

Figure 1A:
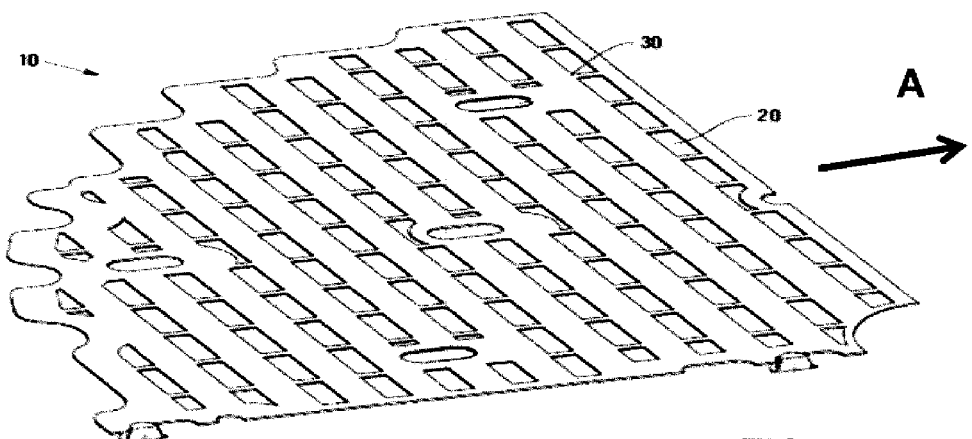
FIG. 1a is a perspective view of a section of a flexible sliding multi-apertured valve plate of a PRIOR ART screen valve.

Referring to FIGS. 1a and b, these show the design of the prior art valve of WO2009/074800. FIG. 1a shows a section of the thin flexible valve plate 10, which comprises individual rows 30 of apertures 20 which extend perpendicular to the axis of motion (Arrow A), whereby the apertures in each row are separated from one another by parallel interstitial elements or struts extending perpendicular to the rows.

Figure 1B:
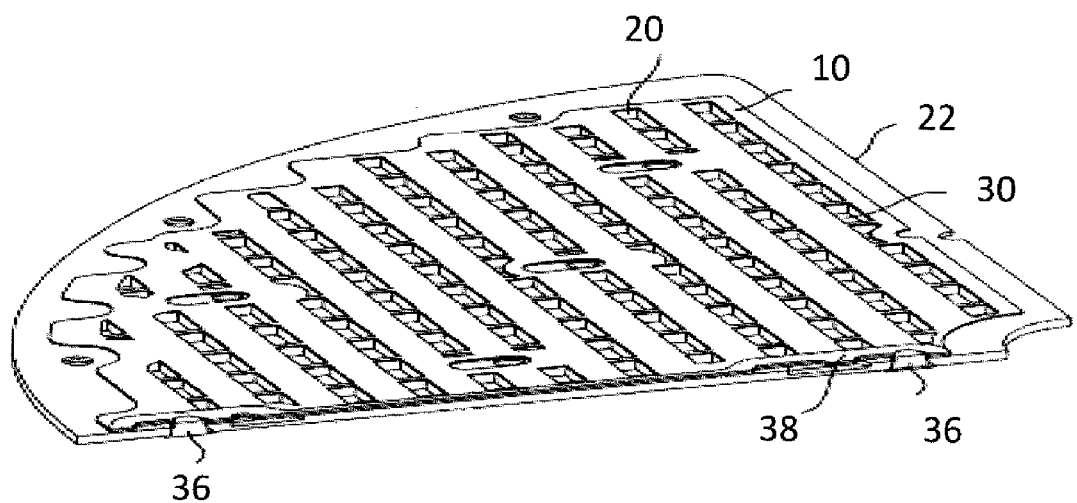
FIG. 1b shows the section of valve plate overlying the corresponding valve seat in the open configuration.

FIG. 1b shows the valve plate 10 as it would overlie the valve seat 22 with the apertures in registration in the open configuration. It is important that the valve plate 10 sits in a precise position relative to the valve seat in the open configuration and closed configuration, and this is achieved by elongate slots provided in reinforced sections 38 in the valve plate which slide around and impact against hard stops 36 provided in the valve seat 22 at each end of the movement.

While this design of interstitial elements is perfectly acceptable for valve plates in normal usage, it has been found that valve plates in very heavy usage or some flexible valve plates are prone to failure at the intersections or nodes of the parallel struts, due to excessive local BENDING loads at the interstitial nodes.

Figure 2:
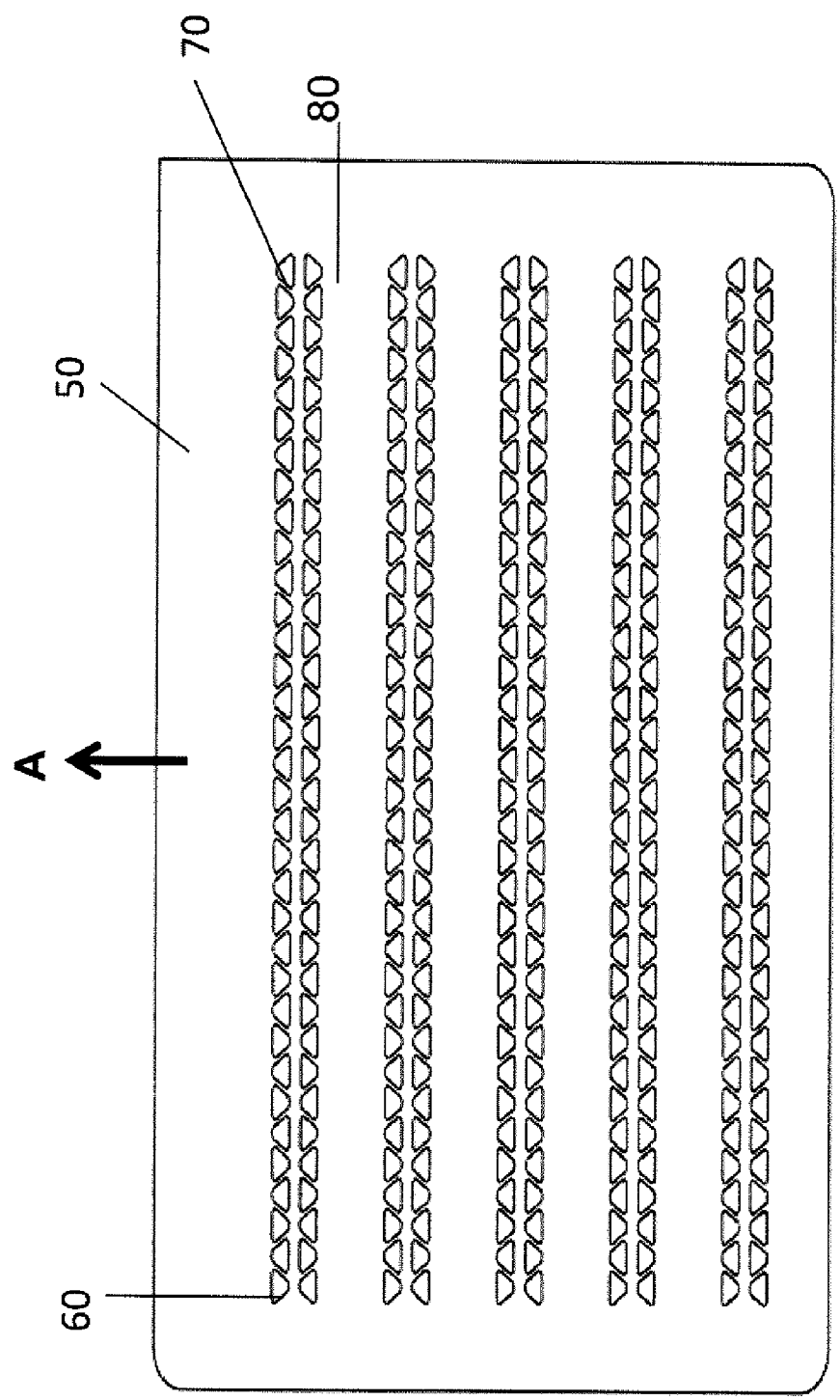
FIG. 2 is a plan view of a multi-apertured valve plate of a screen valve according to the first aspect of the present invention; and, FIG. 3 is a plan view of a multi-apertured valve plate of an alternative screen valve according to the present invention.

Referring to FIG. 2, in accordance with the second aspect of the invention, there is shown a flat flexible plastics valve plate intended for linear reciprocation along axis of motion A relative to a valve seat; the valve plate could also be a thin metallic plate made of stainless steel or high temperature alloy.

Valve plate 50 has an array of trapezoidal ports 60 arranged (alternately upwards and downwards) in double rows 70 separated by double-width lands 80. Ports 60 extending in the rows transversely to the axis of motion (Arrow A) have straight sides defined by thin elongate struts that subtend a shallow angle of about 40° from the axis of motion.

If the valve plate is caused to reciprocate backwards and forwards along its axis of movement, the structural stress distribution and hence fatigue characteristics of the screen valve are significantly improved where the struts all subtend a shallow angle of 15-45 degrees from the said axis of movement. Also, rather than being randomly arranged, the struts across the array are all lined up with one another between successive rows so as to define "lines of force" converging upon the axis of movement; hence, the local loads created at both ends of the respective interstitials (i.e. at the nodes) are aligned thereby providing lines of load bearing. In this plate, mirror image lines of force defined by interstitials subtending mirror angles with respect to the axis of movement are provided for even load bearing since acceleration loads are being applied in both directions along the axis of motion.

The struts widen to concave intersections to provide the straight-sided ports with rounded corners, further assisting the stress distribution.

The valve plate 50 (and seat) could also be a gently curved planar plate (as opposed to a flat planar plate) and undergo linear or rotary reciprocation, depending on the direction of curving.

Figure 3:
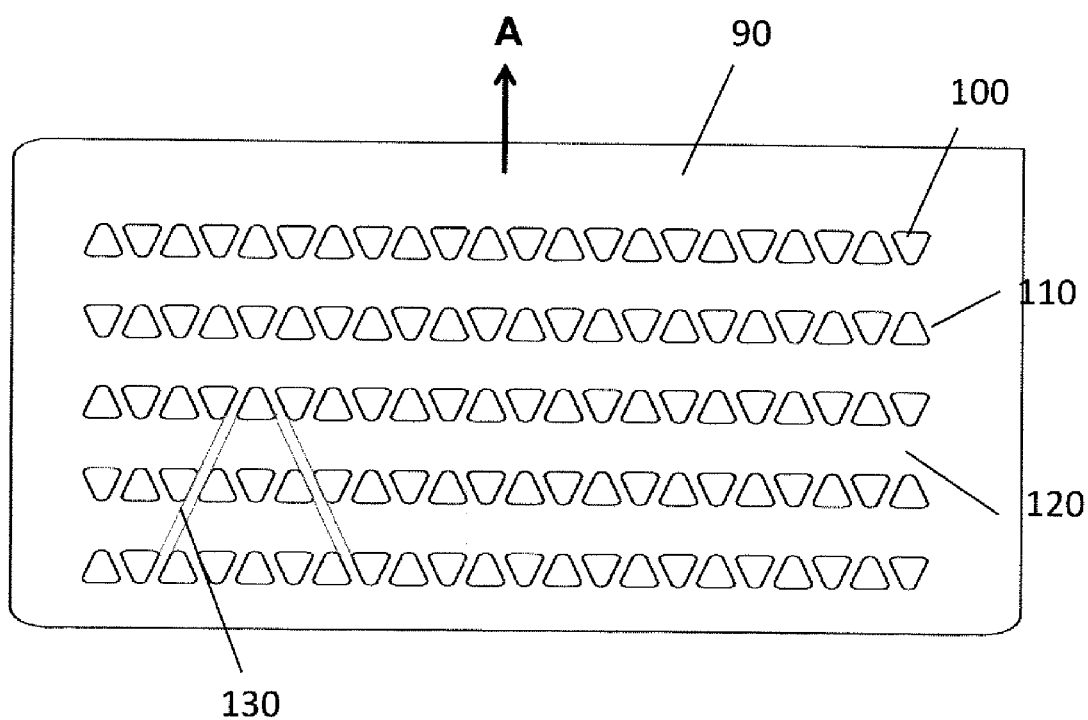

Referring to FIG. 3, this shows an alternative flexible plastics valve plate 90 having an array of triangular ports 100 arranged (alternately upwards and downwards) in single rows 110 separated by single-width lands 120; the valve plate could also be a thin metallic (e.g. rigid or flexible) plate made of stainless steel or high temperature alloy.

Neighbouring ports 100 extending in the rows transversely to the axis of motion (Arrow A) have straight sides defined by thin elongate struts that subtend a shallow mirror angle of + and −15° from the axis of motion. As shown in FIG. 3, the struts are aligned across the respective rows of the array to give parallel lines of load bearing 130 at both mirror angles to the direction of motion.

Figure 4:
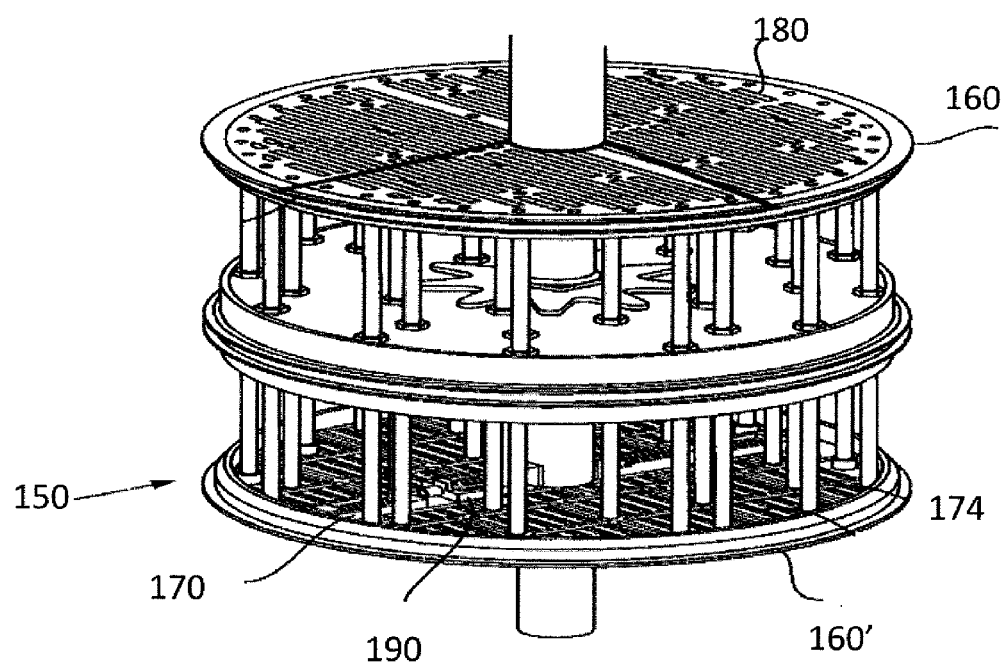
FIG. 4 is a perspective view of a double-acting moving piston assembly that may incorporate a multi-apertured screen valve.

FIG. 4 is a perspective view of a double-acting moving piston assembly that may be used for example in a heat pump and/or heat engine and that may incorporate a reciprocating multi-apertured screen valve. The piston assembly comprises active upper and lower piston faces 160, 160', each provided with an outwardly disposed multi-apertured valve seat 180 and an inwardly disposed movable flexible multi-apertured valve plate 170, which is covered by a retaining plate framework 174. The valve plate 170 is caused by spring mechanism or actuator 190 laterally to reciprocate to and fro relative to the valve seat 180 between an open position where fluid flow through the aligned apertures of the valve plate and seat is allowed, and a closed position where the apertures are unregistered and fluid flow is prevented.

This valve plate has to withstand acceleration and deceleration forces associated with frequent actuated opening and closing movements, as well as varying gas pressure loads and varying inertial loads due to the valve plate being located on a moving piston face. Hence, if the valve plate apertures are replaced with angled apertures according to the first aspect of the present invention, such a laterally reciprocating screen valve will have improved longevity.

Figure 5A:
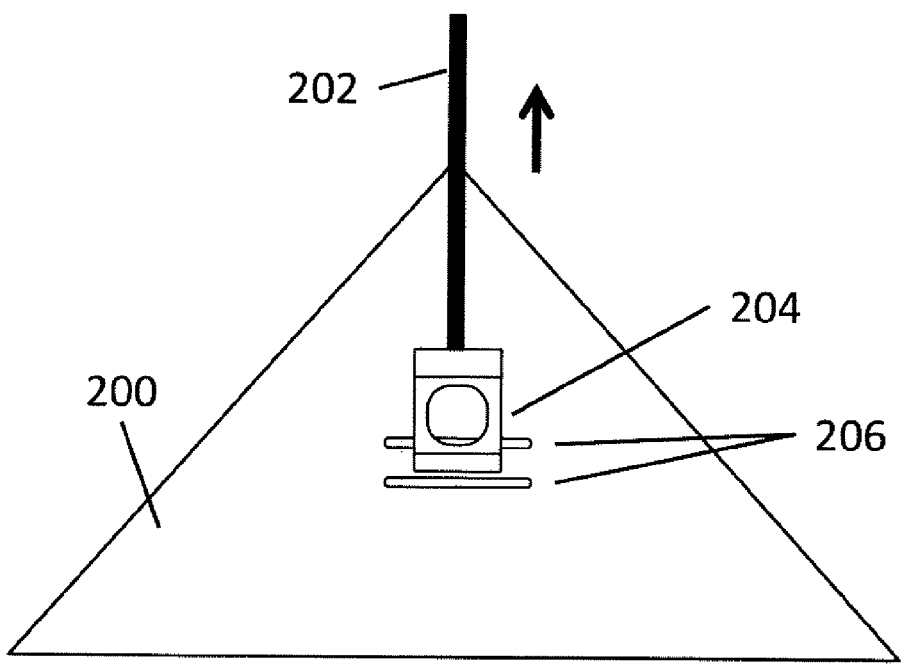
FIGS. 5a and 5b are respectively plan and side schematic views of a screen valve with a resilient support element according to the second aspect of the invention.
Figure 5B:
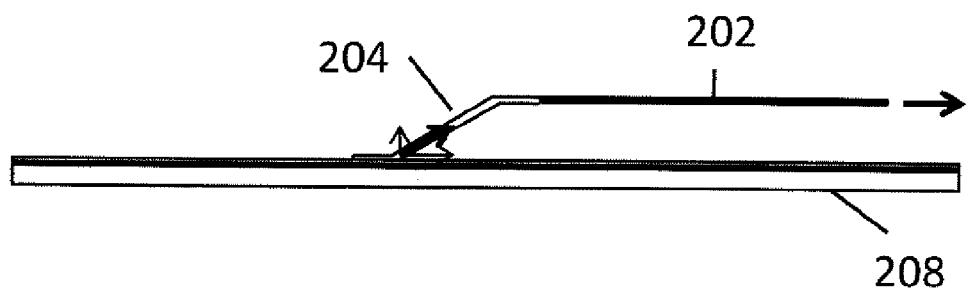

FIGS. 5a and 5b show a screen valve in accordance with the second aspect of the invention whereby the valve plate is able to "float" relative to the valve seat.

Triangular multi-apertured valve plate 200 (ports not shown) is supported by a resilient connector 204, which is a split flexure (to reduce its weight) attached by welding or riveting to the valve plate at or near its centre of gravity. Cut-away sections 206 are provided in the valve plate 200 in the vicinity of the flexure attachment in order to relieve any stresses in the plate and hence any distortion. The flexure 204 is itself directly attached to (e.g. mounted on) actuator arm 202, which causes the valve plate to reciprocate sideways relative to the valve seat 208.

The flexure 204 is able to flex resiliently so as to allow the spacing between the valve seat and valve plate to be varied slightly. Such "floating" of the valve plate 200 allows it to move close enough to the valve seat 208 for effective sealing (e.g. under the influence of fluid pressure), whilst ensuring that it is not permanently so close to the seat that friction is encountered giving rise to wear or slower valve events. Depending on the valve environment (for example, how much gas pressure loads may force the valve plate away from the valve seat), it may be necessary to restrict the degree of flexing in the flexure either by its design, or by the use of an intermediate retaining plate disposed between the actuator arm 202 and valve plate 200, but designed so as not to impede the flexure's path.

Referring to FIG. 5b, the valve plate is shown in the CLOSED configuration over valve seat 208. The flexure 204 is a flat spring element formed of three sections, with the middle section angled at about 20 degrees to the horizontal; this angle would depend on how close to the valve the frame is located. Movement of the actuator arm away from the CLOSED configuration therefore generates a lifting bias force that assists the kick-off of the plate. Such biasing can be useful in overcoming gas pressure loads or inertial loads (e.g. in moving valves) that might otherwise impede the actuated movements (e.g. kick-offs or halts).

Figure 6A:
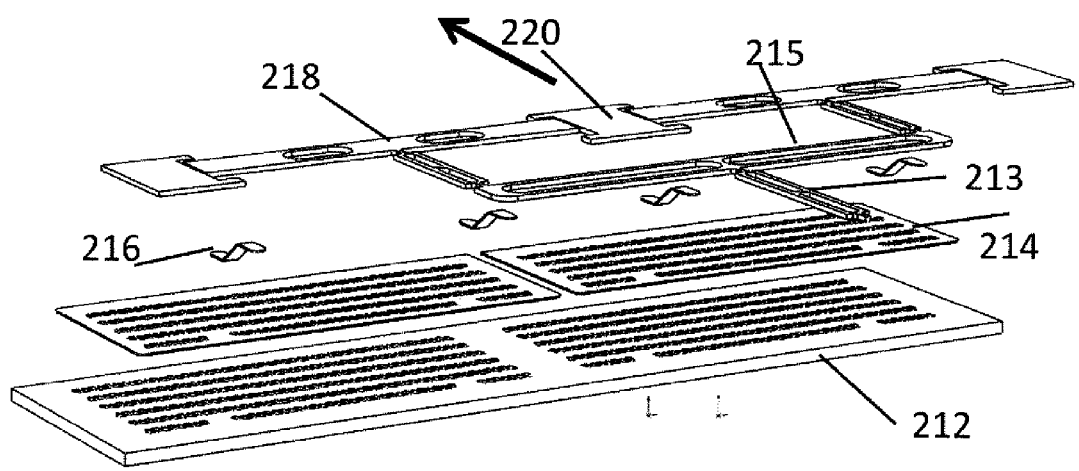
FIGS. 6a and 6b are respectively exploded perspective and side schematic views of a screen valve arrangement according to the first, second and third aspects of the invention.

FIG. 6a shows an exploded view of a screen valve arrangement according to the first, second and third aspects of the invention and suitable for use in the active piston face of a moving piston of a heat pump.

In this embodiment, twin valve plates 214 are controlled and supported by a single actuator frame 218 mounted on an actuator. The twin flexible valve plates 214 are configured for lateral reciprocation in unison in the direction of the arrow relative to single valve seat 212. The valve plates 214 are provided with single rows of multiple triangular ports separated by angled interstitials for improved load bearing according to the first aspect, their arrangement being as shown in FIG. 3.

Figure 6B:
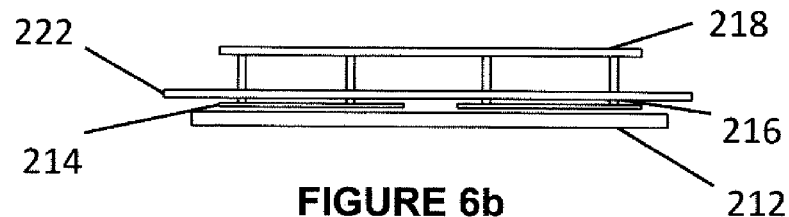

According to the second aspect, each valve plate 214 is supported by a pair of flat spring elements or flexures 216 welded to the valve plate 214 and the actuator frame 218 respectively. The solid flexures 216 are stiff enough to transmit the actuator push/pull forces but are sufficiently resilient to allow the valve plate to float at a variable spacing from the valve seat 212. The flexures 216 pass through an open mesh retaining plate 222, as shown in FIG. 6b (but omitted from FIG. 6a for simplicity), which limits this floating movement. The flexures 216 again have an angled section to provide a bias lifting force.

The actuator frame 218 according to the third aspect comprises a first equalising sub-frame or whiffle frame comprising a cross-beam 215 supported at its central pivot point by a flat narrow elongate element 213 which is necked at both ends and is itself mounted on an actuator arm (not shown). The two ends of the cross-beam 215 of the first whiffle frame each support a similarly oriented downstream whiffle frame, one to support and control each valve plate 214, each frame comprising a necked elongate element centrally supporting a cross-beam on which the pair of flexures is welded. All the elements and cross-beams have cut-out sections for reduced weight.

Stops 220 are mounted to a fixed structure (not shown) above the valve seat 212 positioned across the ends of the cross-beams and provided with opposed abutment surfaces which bring the ends of each cross-beam (supporting a respective valve plate) to a halt in the OPEN and CLOSED valve positions.

Figure 8:
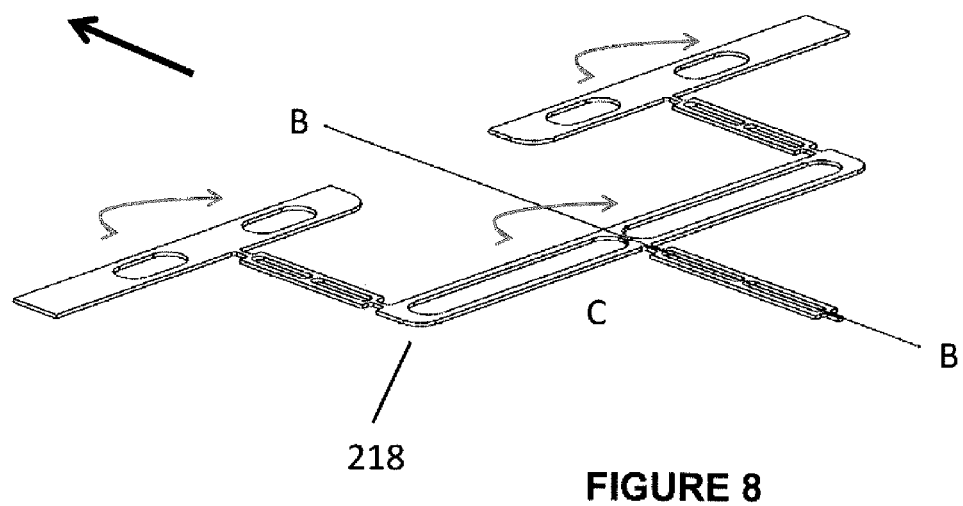
FIG. 8 is a perspective view of the actuator frame 218 of FIG. 6, showing possible degrees of rotational freedom.

Referring to FIG. 8, this shows the possible degrees of rotational freedom on the actuator frame 218 of FIG. 6. In addition to the actuated reciprocation, the necked elements allow the cross-beams to swivel in their planes about the pivot point (yaw), which means that the flexures on each cross-beam can correspondingly cause some swivelling in their respective valve plates. In the FIG. 6 embodiment the crossbeams and necked elements would normally be constrained (e.g. by bearings, grooves, etc) so that they have limited movement apart from yaw and reciprocation. In other configurations, such as those using rigid connectors, the necked sections of the elements can also introduce some pitching or other vertical movement of the frame.

Figure 7:
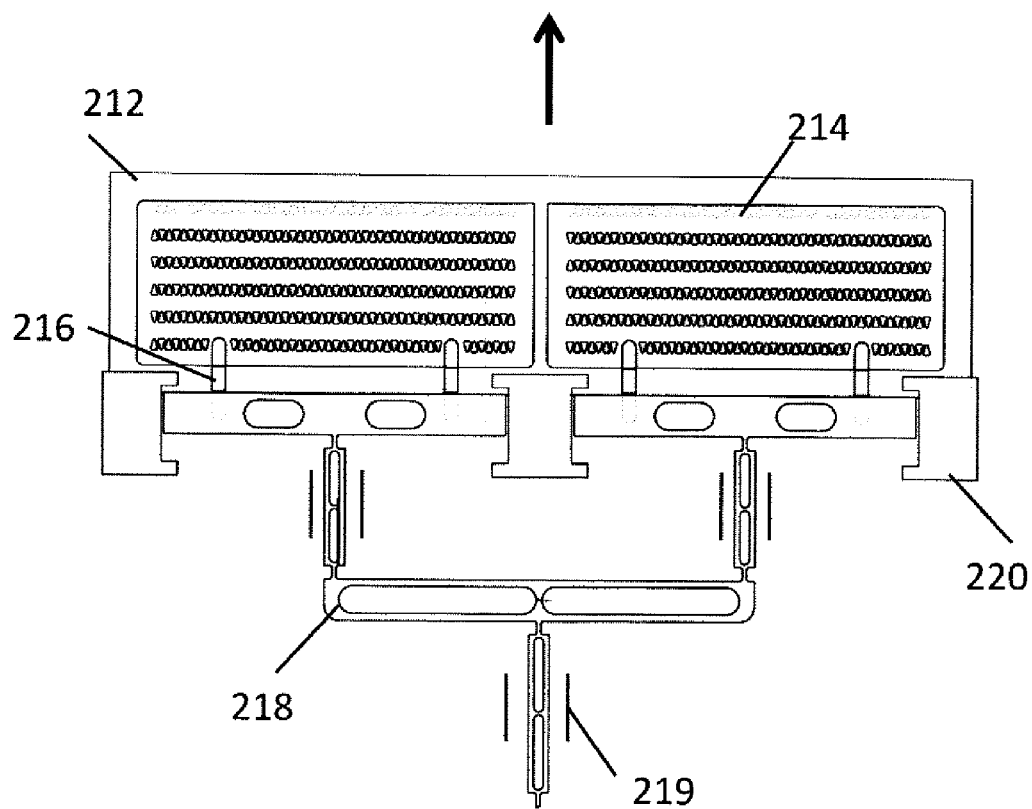
FIG. 7 is a plan view of the screen valve arrangement of FIGS. 6a and 6b.

Turning to FIG. 7, this shows the fully assembled screen valve arrangement of FIG. 6 (except the retaining plate). In operation, the actuator frame 218 transmits the controlled actuator movements to the valve plates which closely follow the frame's movements in the direction of motion. In this embodiment, it is preferred for the resilient connectors to allow the valve plates to move up and down. The flat narrow elongate elements 213 are each slidably mounted in elongate enclosed channels which preferably constrain movement in all directions apart from backwards and forwards (the direction of reciprocation) and allow some limited yaw and side float. The cross-beams 215 may also be constrained in all directions apart from backwards and forwards (direction of reciprocation) and yaw, also with some limited room to float sideways in response to yaw from downstream components. Vertical movement may be constrained by adding upper and lower guide surfaces (not shown).

The use of the actuator frame allows accurate positioning of the valve plates and hence allows sealing areas to be minimised improving valve efficiencies. The series of equalizing sub-frames are able to evenly distribute the actuator forces across the actuator frame so that the valve plates can lock in their desired OPEN or CLOSED configurations against stops 220 in any order; in effect, the swivelling of the individual cross-beams allows for any minor mis-alignments to be automatically corrected and for the valve plates to find the correct OPEN or CLOSED position each and every time. This allows for an assembly that does not require very high levels of accuracy.

The use of the actuator frame also protects the valve plates from wear since no edges of the valve plate interact with any surfaces: instead, the cross-beams interact with the positioning mechanisms 220. The use of a multi-stage actuator frame also allows smaller valve plates that can move independently, under the control of respective whiffletree frames, yet be controlled by a single actuator. The use of smaller plates have a number of other significant benefits. Smaller plates are less prone to distortion from thermal effects i.e. cupping in response to heat on one side of the plate only or just thermal expansion and contraction. If multiple attachment points are picked on a single plate then there is a greater likelihood that the attachment points will come into conflict and induce stresses between them. If only one or two attachment points are used then the stresses at the attachment points grow significantly as the valve plate gets larger. Smaller plates have lower inertial forces per plate, so this can therefore mean lower stresses at each attachment point. Furthermore multiple plates are unlikely to suffer from simultaneous hard impacts, as they are unlikely to all be stopped at exactly the same time.

Figure 9:
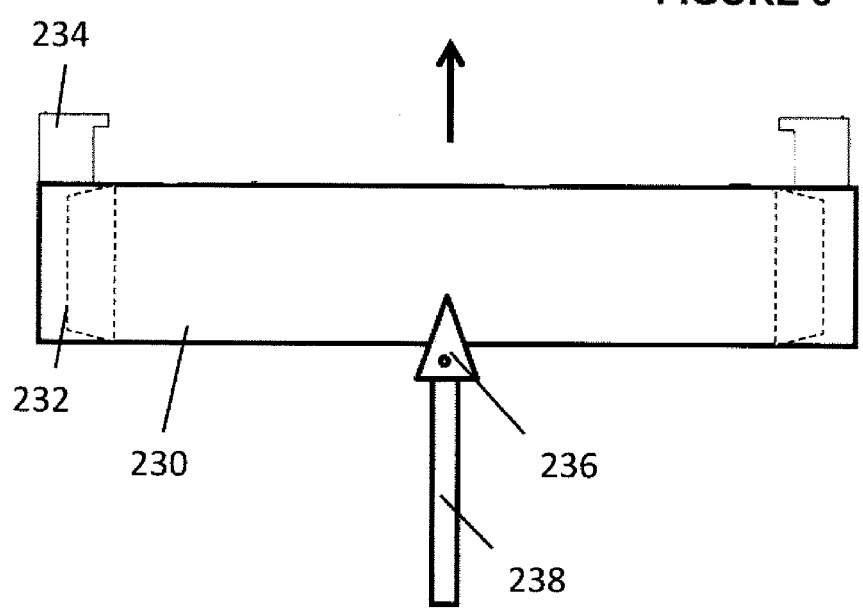
FIG. 9 is a plan view of an alternative actuator frame according to the second aspect of the invention.

FIG. 9 is a plan view of a simpler actuator frame 230 according to the second aspect of the invention. The frame is mounted upon actuator arm 238 and can support a single valve plate via flexible connectors 232. In this case, rather than being a flexing framework, the frame is a solid rectangular body 230 provided with abutment surfaces 234 that can interact with positional stops. Again some swivelling (yaw) is permitted around an optional pin hinge 236 for accurate positioning, but the frame permits no up or down movements itself.

Figure 12A:
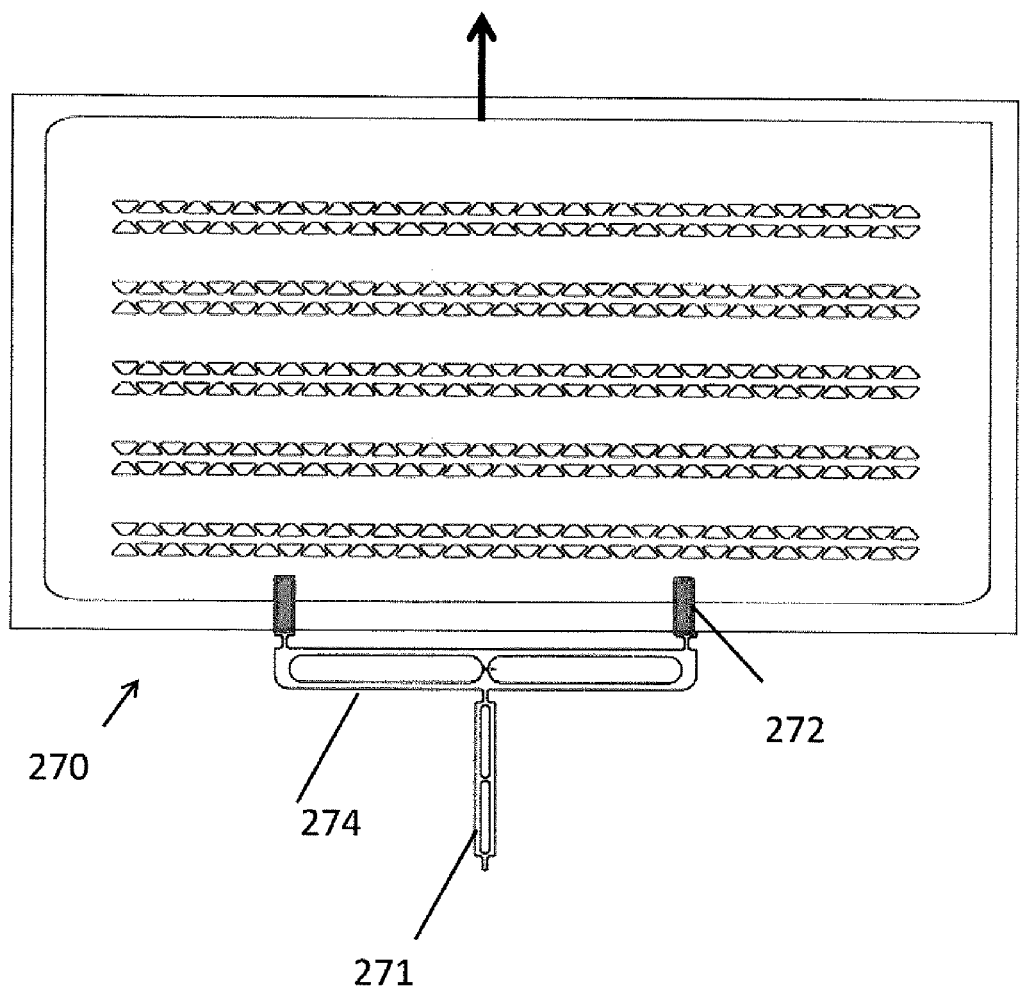
FIGS. 12a and 12b are plan views of further alternative screen valve arrangements with actuator frames according to the second aspect of the invention.
Figure 12B:
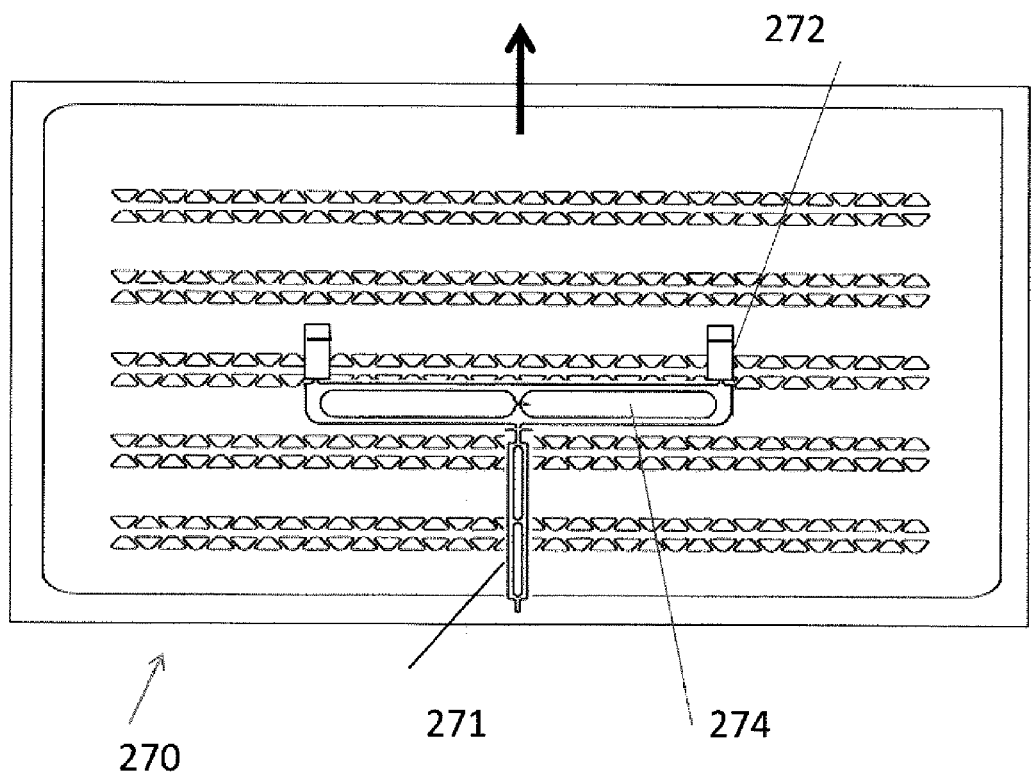

FIG. 12a is a plan view of another actuator frame 270 according to the second aspect of the invention, which can support a single valve plate. In this case, the frame 270 comprises a single whiffletree frame 274 which supports a rigid valve plate in the plane of the valve plate via rigid connectors 272 for sliding movement over the valve seat. Elongate element 271 allows limited pitch and movement in the vertical plane at the necks, which allow the valve plate to seal against the valve seat, while not suffering unduly from friction when moving. FIG. 12b shows a similar actuator frame 270 again comprising a single whiffletree frame 274 which in this case overlies and supports a rigid valve plate from above. In this case, resilient hinged connectors 272 support and guide the valve plate, their attachments to the valve plate being symmetrically disposed either side and level with the centre of gravity of the plate.

Figures 10, 11:
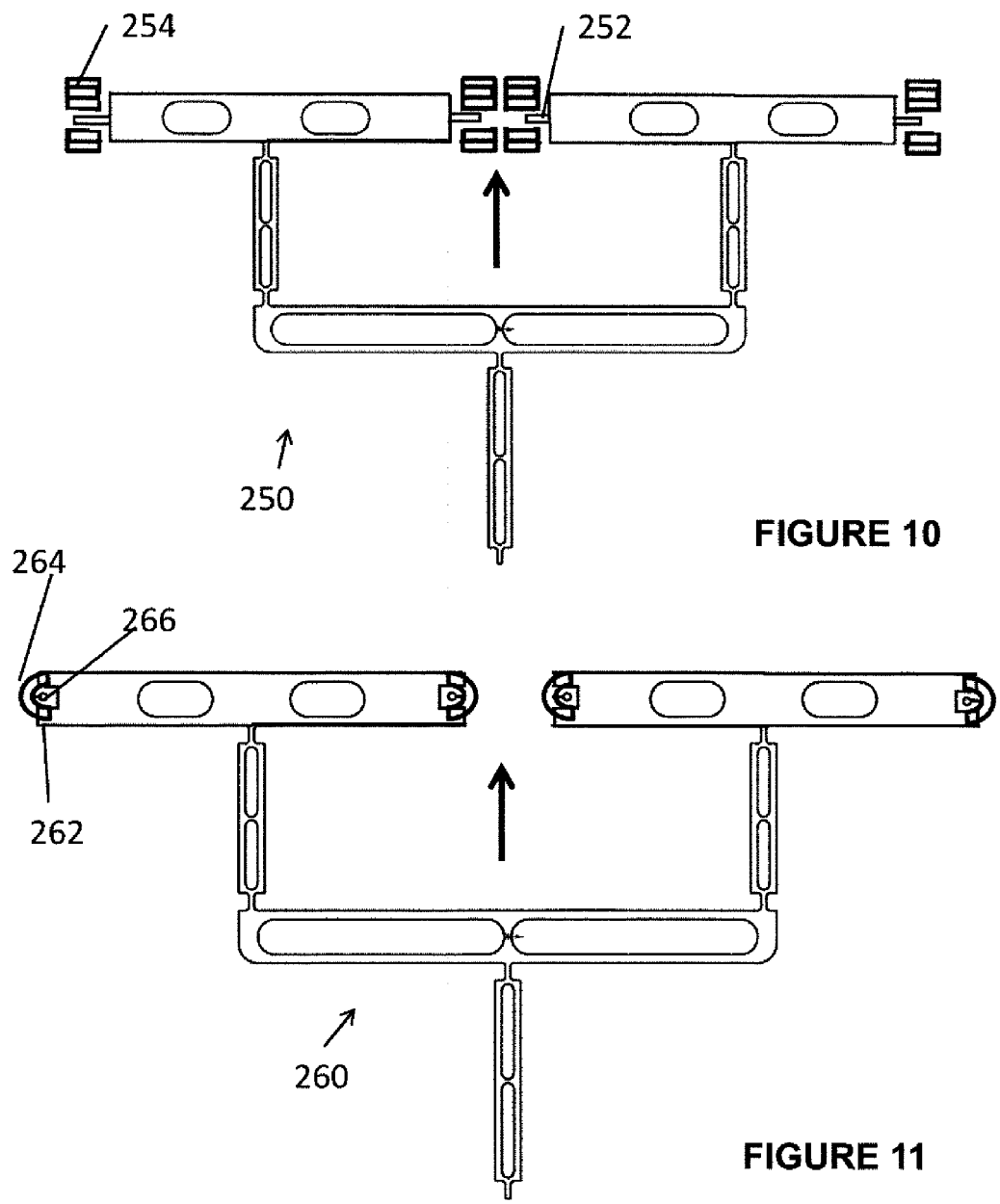
FIG. 10 is a plan view of a further actuator frame according to the second and fourth aspects of the invention including a positioning and damping mechanism.
FIG. 11 is a plan view of a further actuator frame according to the second and fourth aspects of the invention including an alternative positioning and damping mechanism.

FIGS. 10 and 11 illustrate two alternative multi-stage actuator frames similar to that of FIGS. 6 and 7 but each including a positioning and damping mechanism according to the fourth aspect of the invention. The fast accelerations and decelerations of a reciprocating valve plate against stops can cause undesirable rebound. The reason rebound is undesirable is particularly noticeable when a valve plate is closing. In this situation it is possible that the gas pressure may lock the valve plate in position after it has rebounded, but when it is not properly sealed—i.e. there is a small gap between valve plate and valve seat which is sufficient to allow pressure to hold the valve in this position, but effectively means the valve is not properly sealed and hence the valve is not pressure tight and it will leak with associated losses. While the use of the frame prevents the valve plate itself suffering wear, any rebound of the heavier actuator frame may also cause the valve to rebound. Accordingly, in some arrangements it may be desirable to use a damping mechanism to dampen the actuator frame as it halts at each end of its reciprocating movement so as to minimise wear and/or rebound.

Any suitable damping mechanism may be used, however, a percussive mechanism, as described above, has been found especially effective. In FIG. 10, the downstream cross-beams have end pins 252 that interact with a combined percussive/gas damping mechanism 254 of the type further described with respect to FIG. 14 below. In FIG. 11, the downstream cross-beams have ends 262 with twin forks that interact with percussive damping mechanism 264/266 of the type further described with respect to FIG. 13 below.

Figure 14:
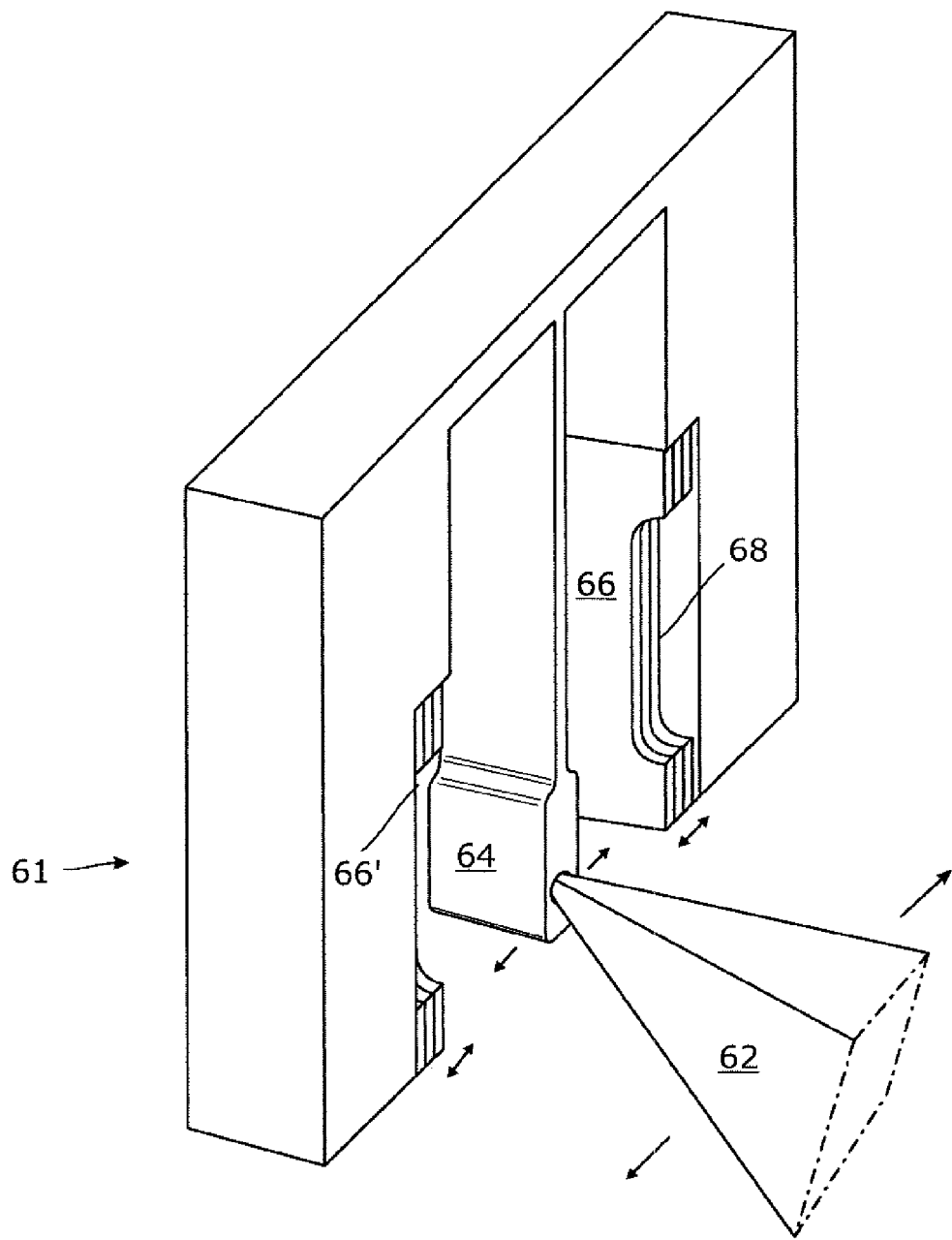

FIG. 14 is a schematic perspective view of a double action, multiple damper assembly 61, that is, a mechanism able to damp reciprocating movement at both ends of the movement. Hence, instead of an abrupt halt, a more gradual deceleration may be achieved.

Arm 62 is part of the actuator frame and undergoes rapid reciprocations linearly to the left and right. The end of the arm is secured to a common damper in an arch in the form of a resilient cantilever 64, whose length and resilience allows the arm freely to reciprocate, but confines it within the arch. (This arm 64 corresponds to pin 252 in FIG. 10. The cantilever 64 could optionally be omitted from the FIG. 10 arrangement, if pins 252 need to move more freely, in which case, the pins themselves can extend into the arch.) At each end of the stroke, damper 64 (or pins 252) impacts against respective multi-damper arrangements 66 and 66', each comprising shorter multi-cantilevered arms 68.

In this example, two damping mechanisms slow the arm 62 which is particularly effective. The arm is decelerated by percussive damping, namely, successive impacts of the adjacent flexing leaves of the shorter multi-cantilevered arms 68, and there is secondary gas damping as gas is forced out from the adjacent leaves thereby attenuating the energy in those leaves. Hence, the actuator frame arm is decelerated and the possibility of undesirable rebound from hard halts is avoided.

Figure 13A:
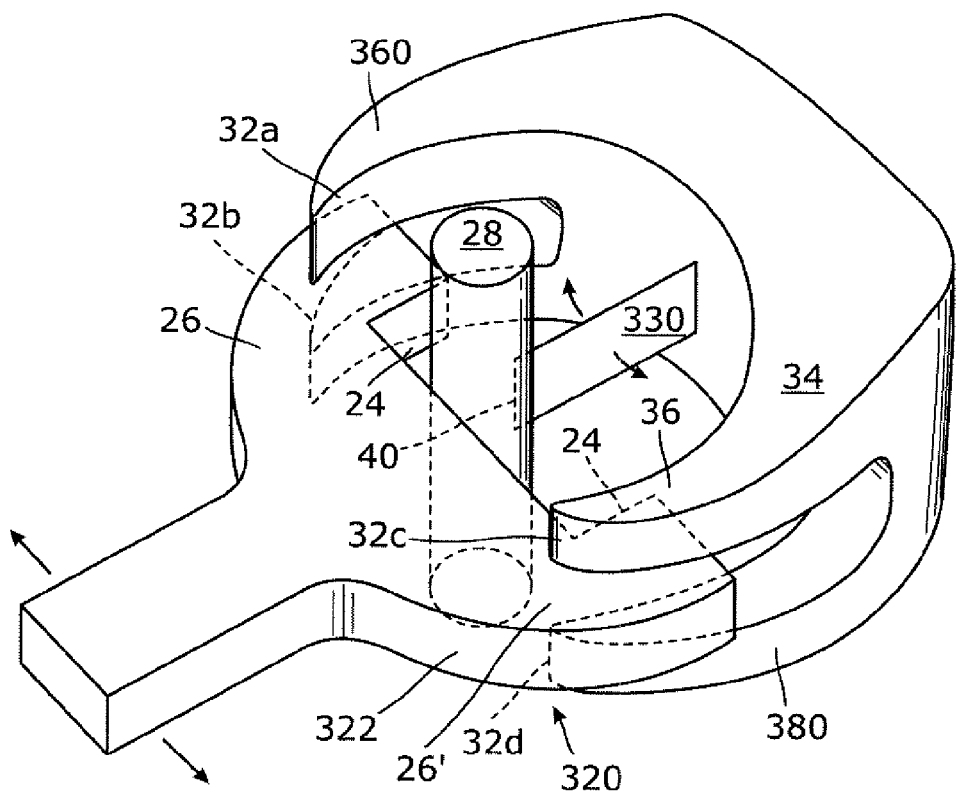
FIGS. 13a and 13b are respectively perspective and side views of a percussive damper mechanism for damping an actuator frame arm according to the fourth aspect, and similar to the mechanism shown in FIG. 11; and, FIG. 14 is a perspective view of a percussive damper mechanism for damping an actuator frame arm according to the fourth aspect, and similar to the mechanism shown in FIG. 10.
Figure 13B:
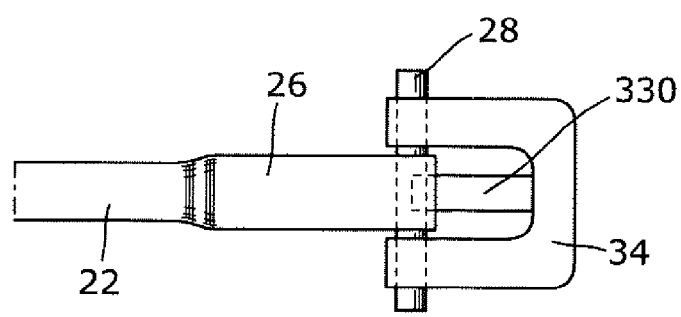

Turning to the damping mechanism of FIGS. 13a and b, these show a double action damper assembly 320 that can damp a linearly reciprocating actuator frame arm 322. This arm 322 corresponds to the cross-beam ends 262 of the actuator frame of FIG. 11. The twin forks 26 of the arm 322 are provided with opposed striking surfaces 24 which would normally impact against objects such as static stops to halt the arm's movement. In this case, however, the stops have been replaced by a double action damper mechanism to achieve a gradual deceleration.

The damper mechanism comprises a single, common damper mass in the form of a hard, solid, cylindrical puck 28. This is constrained by a leaf spring 330 to travel in an arc bouncing back and forth between impact surfaces 32a-32d of fixed common curved bracket assembly 34 and the moving twin forks 26. The bracket assembly has upper arms 360 and lower arms 380 and the cylindrical puck damper 28 extends beyond the upper and lower arms in length, as may be seen in FIG. 13b, so that when the damper bounces off the upper and lower arms on one side of the bracket 34, it receives balanced angular forces about its centre of mass 40 (point of attachment). The reciprocating arm 322 reciprocates linearly back and forth within a plane of motion between the upper and lower arms, as may also be seen in FIG. 13b, and at each end of its stroke one of the forks 26 will move outside the curved bracket assembly 34. Thus, at one end of the arm's stroke, the damper puck 28 will be bouncing back and forth between impact surfaces 32a/32b and one fork 26' reducing the kinetic energy of the arm through such multiple collisions, and similarly, at the other end of the arm's stroke between impact surfaces 32c/32d and the other fork 26. Hence, the actuator frame ends are decelerated more gradually and rebounds due to abrupt halts are avoided.

While the invention has been described by reference to specific embodiments, it should be understand that the invention is not limited to the described embodiments and numerous modifications may be made within the scope of the present invention. As explained above, while the invention has mainly been described with respect to linear reciprocation, the various aspects of the invention are also applicable to rotary reciprocating valve environments. Also, while a flat planar valve plate has mainly been described, the valve plate and seat (and actuator frame) in the various aspects could lie in a curved plane (e.g. gently curved plane), especially where the mode of reciprocation is rotary.

The invention claimed is:

1. A screen valve for controlling fluid flow comprising at least one multi-apertured valve plate oriented in a plane and operatively connected to an actuator for sliding movement relative to a multi-apertured valve seat, the valve plate being connected to the actuator via one or more resilient support elements configured to allow a floating movement of the valve plate normal to the plane of the valve plate,
   wherein the one or more resilient support elements is configured to constrain the at least one valve plate closely to follow the movements of the actuator in the plane of the valve plate, while allowing the floating movement in the direction normal to the plane.

2. A screen valve according to claim 1, wherein the sliding movement is a laterally reciprocating movement.

3. A screen valve according to claim 1, wherein the valve plate is disposed between the valve seat and a retaining plate.

4. A screen valve according to claim 1, wherein the at least one multi-apertured valve plate is a flexible plate-like member.

5. A screen valve according to claim 1, wherein the one or more resilient support elements comprises a flat spring element.

6. A screen valve according to claim 1, wherein the one or more resilient support elements are angled such that movement of the actuator in one direction generates a bias force that lifts the valve plate away from the plane of the valve seat.

7. A screen valve according to claim 1, wherein the one or more resilient support elements are integrally formed with the valve plate.

8. A screen valve according to claim 1, wherein the one or more resilient support elements are fixedly attached to the at least one valve plate.

9. A screen valve according to claim 1, wherein the valve plate is operatively connected via an actuator frame to an actuator for lateral reciprocating movement, and wherein the actuator frame supports the one or more resilient support elements.

10. Apparatus comprising:
    a moveable surface; and
    a screen valve for controlling fluid flow, the screen valve comprising at least one multi-apertured valve plate oriented in a plane and operatively connected to an actuator for sliding movement relative to a multi-apertured valve seat, the valve plate being connected to the actuator via one or more resilient support elements configured to allow a floating movement of the valve plate normal to the plane of the valve plate, wherein the screen valve is located upon the moveable surface, and wherein the one or more resilient support elements is configured to constrain the at least one valve plate closely to follow the movements of the actuator in the plane of the valve plate, while allowing the floating movement in the direction normal to the plane.

11. Apparatus comprising:

gas compression and/or expansion equipment in which at least one gas inlet and/or outlet valve comprises a screen valve for controlling fluid flow, the screen valve comprising at least one multi-apertured valve plate oriented in a plane and operatively connected to an actuator for sliding movement relative to a multi-apertured valve seat, the valve plate being connected to the actuator via one or more resilient support elements configured to allow a floating movement of the valve plate normal to the plane of the valve plate, wherein the one or more resilient support elements is configured to constrain the at least one valve plate closely to follow the movements of the actuator in the plane of the valve plate, while allowing the floating movement in the direction normal to the plane.

12. Apparatus according to claim 11, wherein the gas compression and/or expansion equipment comprises positive displacement equipment.

13. Apparatus according to claim 11, wherein the gas compression and/or expansion equipment is incorporated in a heat pump and/or heat engine.

14. A screen valve according to claim 9, wherein the actuator frame supports a plurality of resilient support elements so that the valve plate is operatively connected to the actuator frame at multiple locations on the surface of the valve plate.

15. Apparatus according to claim 10, wherein the moveable surface comprises a moveable piston face upon which the screen valve is located.

16. Apparatus according to claim 10, wherein the sliding movement is a laterally reciprocating movement.

17. Apparatus according to claim 12, wherein the gas compression and/or expansion equipment comprises piston expanders and/or piston compressors.

18. A screen valve according to claim 1, wherein the valve plate is a flat planar plate.

* * * * *